United States Patent
Liao et al.

(10) Patent No.: US 11,118,024 B2
(45) Date of Patent: Sep. 14, 2021

(54) METHOD FOR PRODUCING THREE-DIMENSIONAL ORDERED POROUS MICROSTRUCTURE AND MONOLITHIC COLUMN PRODUCED THEREBY

(71) Applicant: Tantti Laboratory Inc., Taoyuan (TW)

(72) Inventors: Chen-Hung Liao, Taoyuan (TW); Yu-Cheng Kuo, Taoyuan (TW); Yu Cheng, Taoyuan (TW); Shih-Horng Yang, Taoyuan (TW)

(73) Assignee: Tantti Laboratory Inc., Taoyuan (TW)

( * ) Notice: Subject to any disclaimer, the term of this patent is extended or adjusted under 35 U.S.C. 154(b) by 41 days.

(21) Appl. No.: 15/699,350

(22) Filed: Sep. 8, 2017

(65) Prior Publication Data
US 2019/0077936 A1 Mar. 14, 2019

(51) Int. Cl.
*C08J 9/26* (2006.01)
*B01J 20/28* (2006.01)
(Continued)

(52) U.S. Cl.
CPC ........... *C08J 9/26* (2013.01); *B01J 20/28042* (2013.01); *B01J 20/28085* (2013.01);
(Continued)

(58) Field of Classification Search
CPC ...... C08J 9/26; C08J 2325/14; B29D 11/0074
See application file for complete search history.

(56) References Cited

U.S. PATENT DOCUMENTS

| 6,260,509 B1 * | 7/2001 | Aslam | G03D 15/06 118/101 |
|---|---|---|---|
| 6,414,043 B1 | 7/2002 | Asher et al. | |

(Continued)

FOREIGN PATENT DOCUMENTS

| CN | 1456535 | 11/2003 |
|---|---|---|
| CN | 10185770 | 10/2010 |

(Continued)

OTHER PUBLICATIONS

S. Lee et al., "Rapid on-chip integration of opal films and photonic gel sensor array via directed enhanced water evaporation for colloidal assembly", Sensors and Actuators B 231 (2016) 256-264.

(Continued)

*Primary Examiner* — Mathieu D Vargot
(74) *Attorney, Agent, or Firm* — Demian K. Jackson; Jackson IPG PLLC

(57) ABSTRACT

The present invention relates to a method for producing a three-dimensional ordered porous microstructure. In the method of the invention where the three-dimensional ordered microstructure is produced using the colloidal crystal templating process, the three-dimensional ordered microstructure thus formed is subjected to heat treatment to soften the particles, so as to effectively increase the contact between orderly arranged particles while removing the solvent used to suspend the particles. The present invention further relates to a monolithic column produced thereby. Compared to the monolithic columns produced by conventional methods, the monolithic column according to the invention is characterized in having a higher aspect ratio and a higher pore regularity, while the connecting pores in the column are relatively large in pore size.

6 Claims, 8 Drawing Sheets

(51) Int. Cl.
  *B01J 20/32* (2006.01)
  *B01J 20/30* (2006.01)
  *B01J 13/14* (2006.01)

(52) U.S. Cl.
  CPC ... *B01J 20/28092* (2013.01); *B01J 20/28095* (2013.01); *B01J 20/3057* (2013.01); *B01J 20/327* (2013.01); *B01J 20/3208* (2013.01); *B01J 20/3293* (2013.01); *B01J 13/14* (2013.01); *C08J 2201/0462* (2013.01); *C08J 2201/0464* (2013.01); *C08J 2325/14* (2013.01); *C08J 2333/04* (2013.01); *C08J 2351/00* (2013.01)

(56) References Cited

U.S. PATENT DOCUMENTS

| | | | |
|---|---|---|---|
| 2005/0066640 | A1 | 3/2005 | Towsley |
| 2009/0174117 | A1* | 7/2009 | Winkler ............... C04B 38/045 264/319 |
| 2011/0309716 | A1* | 12/2011 | Jenninger ............ B32B 27/365 310/300 |

FOREIGN PATENT DOCUMENTS

| | | |
|---|---|---|
| CN | 102659977 | 9/2012 |
| CN | 103086317 * | 5/2013 |
| CN | 104976925 | 10/2015 |
| CN | 105525343 | 4/2016 |
| JP | 02290552 A | 11/1990 |
| JP | 04187237 A | 7/1992 |
| JP | 06265534 A | 8/2002 |
| JP | 2002527335 | 8/2002 |
| JP | 2007145636 | 6/2007 |
| JP | 2011528808 | 11/2011 |
| TW | I558866 | 11/2016 |
| TW | 201718394 | 6/2017 |
| WO | 0021905 | 4/2000 |
| WO | 2010009558 | 1/2010 |
| WO | 2017080496 | 5/2017 |

OTHER PUBLICATIONS

D. Christie et al., "Glass Transition Temperature of Colloidal Polystyrene Dispersed in Various Liquids", Journal of Polymer Science, Part B: Polymer Physics 2016, 54, 1776-1783.
H. He et al., "Three-Dimensionally Ordered Macroporous Polymeric Materials by Colloidal Crystal Templating for Reversible CO2 Capture", Adv Fund. Materials 2013, 23, 4720-4728.
H. He et al., Supporting Information for "Three-Dimensionally Ordered Macroporous Polymeric Materials by Colloidal Crystal Templating for Reversible CO2 Capture", Adv. Funct. Materials 2013, 23, 4720-4728.
Extended European Search Report for Application No. 18174330.3 dated Dec. 12, 2018.
Written Opinion for Application No. 18174330.3.
Taiwan Search Report for Application No. 107105579 dated Jun. 11, 2018.
A. Stein et al., "Design and functionality of colloidal-crystal-templated materials—chemical applications of inverse opals" Chern. Soc. Rev. 2013, 42, 2763.
H. He et al., "Three-Dimensionally Ordered Marcroporous Polymeric Materials by Colloidal Crystal Templating for Reversible CO2 Capture" Adv. Funct. Mater. 2013, 23, 4720-4728.
Japanese Office Action for Application No. 2018-114132 dated Jul. 24, 2019.
Chinese Search Report for Application No. 2018101516085.
JP OA, Application No. 2018-114132, issued Apr. 2, 2020.

* cited by examiner

METHOD FOR PRODUCING THREE-DIMENSIONAL ORDERED POROUS MICROSTRUCTURE AND MONOLITHIC COLUMN PRODUCED THEREBY

BACKGROUND OF INVENTION

1. Field of the Invention

The present invention relates to a method for producing a three-dimensional ordered porous microstructure. The invention further relates to a three-dimensional ordered porous microstructure with high thickness as produced by said method, and more particularly to a monolithic column with high aspect ratio.

2. Description of Related Art

A highly ordered porous material having a pore size close to the wavelength of light may possess unique and useful optical properties, making it applicable in various technical fields, such as photocatalysis, biological carriers, adsorption, filtration, electrical insulation, chromatographic fractionation, semiconductors and micro-detection.

Ordered porous microstructures are basically made of medium material arranged periodically in one, two or three dimensions. One-dimensional ordered porous microstructures are generally referred to as optical multilayer films, which have commonly served as coatings on optical lenses. The periodic multilayer films exhibit one-dimensional photonic band-gaps in which photons are prohibited from propagating through the films and, as a result, certain wavelengths of light are reflected efficiently. Recently, periodic two- and three-dimensional microstructures have drawn considerable attention.

It is known in the art that a three-dimensional ordered porous microstructure having photonic crystal properties can be produced by self-assembling mono-sized polystyrene, poly(methyl methacrylate) or silicon dioxide nanospheres on a substrate by means of gravity sedimentation, centrifugation or vacuum filtration to create a three-dimensional ordered microstructure on the substrate, followed by using the three-dimensional ordered microstructure as a template to which inorganic siloxane monomers are then applied and subjected to a sol-gel reaction, and finally by removal of the substrate via calcination or extraction. Said process is commonly known as colloidal crystal templating, and is disclosed in, for example, U.S. Pat. No. 6,414,043 and Chinese Patent Publication No. 104976925A1.

Taiwanese Patent No. 1558866 discloses a method for fabricating a three-dimensional ordered microstructure, which involves application of a shaping electric field to facilitate the self-assembling of particles, thereby forming a hexagonal closest packing of the particles. WO2017/080496A1 disclosed a method involving facilitating the self-assembling of particles, thereby forming a three-dimensional ordered microstructure composed of a close-packing of the particles. A sacrificial layer is built between the three-dimensional ordered microstructure and the substrate to help maintaining the structural integrity of the three-dimensional ordered porous microstructure when the microstructure is being removed from the substrate.

A three-dimensional ordered porous microstructure with a large surface area can be manufactured successfully by using the techniques known in the art, but the thickness of the microstructure thus produced is still unsatisfactory. In the course of building the three-dimensional ordered microstructure, at least some particles are arranged in closest packing, where each particle is tangent to 12 adjacent particles. When the particle is configured as a hard sphere, its contact with an adjacent particle is theoretically a single point. Since the particles used are practically impossible to be completely uniform in size, some adjacent particles may not contact each other at all. As the thickness of a three-dimensional ordered microstructure increases, the insufficient contact between particles is likely to decrease the structural strength.

Theoretically, a three-dimensional ordered porous microstructure with high aspect ratio is a suitable for serving as a monolithic column for chromatographic separation of material, taking advantage of its regular internal framework and periodic porous structure. However, the conventional colloidal crystal templating processes would take several days, difficult to achieve mass production, and the template structures thus fabricated commonly have loose arrangement of particles, so that the resultant three-dimensional ordered porous microstructure product has poor continuity, and its aspect ratio is limited. In addition, the conventional processes use hard nanospheres and, therefore, the contact areas among adjacent particles in the template are extremely limited. As a result, the connecting pores among the macropores in the inverse structure produced from the template will be too small, and the monolithic column thus produced has a low mass transfer rate and an overly high backpressure. Using colloidal crystal templating to produce monolithic column must face time consuming and inefficient template removal procedure. These drawbacks reduce the productivity and commercial applicability of monolithic columns severely.

Therefore, there is still a need for producing a three-dimensional ordered microstructure in high thickness and using it as a template to produce a three-dimensional ordered porous microstructure.

SUMMARY OF THE INVENTION

Now, the inventors unexpectedly found that during the course of using colloidal crystal templating to produce a three-dimensional ordered microstructure, the particles may be subjected to a heat treatment to soften the particles after the self assembly of particles. Such heat treatment not only enhances the contact between the orderly arranged particles effectively, but also removes the solvent for suspending particles from the three-dimensional ordered microstructure, whereas the solvent thus heated, though evaporated rapidly, will not damage the three-dimensional ordered microstructure substantially. It is more important to note that the connecting pores in the monolithic column produced by using said three-dimensional ordered microstructure as a template have a larger pore size as compared with those formed by the conventional methods, resulting in the advantages of high mass transfer efficiency and low column backpressure. The invention overcomes the above drawbacks in the existing technology accordingly.

In the first aspect provided herein is a method for producing a three-dimensional ordered porous microstructure. Said method comprises the steps of:

A. forming a three-dimensional ordered microstructure of particles, so that interstitial voids are formed between the particles;
B. heating the three-dimensional ordered microstructure to soften the particles;
C. filling an inverse opal material into the interstitial voids; and D. removing the three-dimensional ordered microstructure to obtain the three-dimensional ordered porous microstructure.

In one preferred embodiment, said particles have a glass transition temperature, and in the step of heating the three-dimensional ordered microstructure, said three-dimensional ordered microstructure is heated at a temperature higher than said glass transition temperature by about 0 to 20° C.

In another preferred embodiment, said particles have a glass transition temperature, and in the step of heating the three-dimensional ordered microstructure, said three-dimensional ordered microstructure is heated at a temperature lower than said glass transition temperature by about 1 to 15° C. In a more preferred embodiment, said three-dimensional ordered microstructure is heated at a temperature lower than said glass transition temperature by about 3 to 15° C. In an even more preferred embodiment, said three-dimensional ordered microstructure is heated at a temperature lower than said glass transition temperature by about 3 to 10° C.

In one preferred embodiment, said particles are homogeneous spherical particles made of a single type homopolymer or copolymer, and said glass transition temperature is the bulk glass transition temperature of particles. In another preferred embodiment, said particles have a core-shell architecture, each particle has a core and a shell covering the core. Said core and shell are made of substantially different polymeric materials, and said glass transition temperature is the glass transition temperature of the shell.

In a preferred embodiment, said step of forming the three-dimensional ordered microstructure include dispersing said particles in a solvent to form a suspension, and allowing said particles to undergo self-assembling, thereby forming the three-dimensional ordered microstructure.

In a preferred embodiment, in the heating step, said three-dimensional ordered microstructure is heated up for a period of time, so as to soften said multiple particles and remove said solvent simultaneously.

In a preferred embodiment, at least some of the particles in the three-dimensional ordered microstructure are in a close-packing arrangement.

In a preferred embodiment, the step of removing three-dimensional ordered microstructure comprises a process selected from the group consisting of Soxhlet extraction and supercritical fluid extraction.

The method described above is applicable to produce a three-dimensional ordered porous microstructure in high thickness, especially applicable to produce a monolithic column with high aspect ratio. Furthermore, in comparison to the monolithic columns produced by conventional processes, the monolithic column disclosed herein has structural features of high aspect ratio, high pore regularity and large connecting pores.

Therefore, in the second aspect provided herein is a monolithic column produced by the method of producing three-dimensional ordered porous microstructure described above.

In the third aspect provided herein is a monolithic column, comprising a plurality of orderly arranged spherical macropores having a uniform diameter ranging from 100 nm to 6 microns, and a plurality of connecting pores interconnecting the macropores, with the connecting pores having a uniform diameter ranging from 10 nm to 3 microns. At least 70% of said macropores are arranged in the form of closest packing, and the respective macropores have a longest radius R and a shortest radius r, where r/R ratio is less than or equal to 0.99.

In a preferred embodiment, at least 80% of said macropores are in a close-packing arrangement. In a more preferred embodiment, at least 90% of said macropores are in a close-packing arrangement. In a most preferred embodiment, at least 95% of said macropores are in a close-packing arrangement.

In a preferred embodiment, said r/R ratio is less than or equal to 0.98. In a more preferred embodiment, said r/R ratio is less than or equal to 0.96. In a most preferred embodiment, said r/R ratio is less than or equal to 0.94.

In a preferred embodiment, said monolithic column has a height of at least 1 cm, and an aspect ratio of no less than 1.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE INVENTION

Unless specified otherwise, the following terms as used in the specification and appended claims are given the following definitions. It should be noted that the indefinite article "a" or "an" as used in the specification and claims is intended to mean one or more than one, such as "at least one," "at least two," or "at least three," and does not merely refer to a singular one. In addition, the terms "comprising/ comprises," "including/includes" and "having/has" as used in the claims are open languages and do not exclude unrecited elements. The term "or" generally covers "and/or", unless otherwise specified. The terms "about" and "substantially" used throughout the specification and appended claims are used to describe and account for small fluctuations or slight changes that do not materially affect the nature of the invention.

Figure 1:
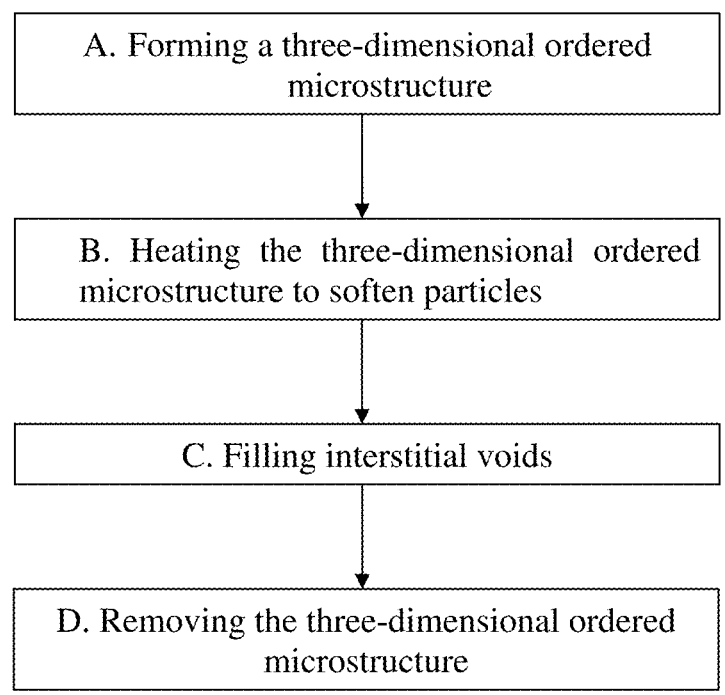
FIG. 1 is the flowchart according, to an embodiment of the invention.

The present invention primarily provides a method for producing a three-dimensional ordered porous microstructure, which is applicable to produce a three-dimensional ordered porous microstructure in high thickness, especially applicable to produce a monolithic column with high aspect ratio. As shown in FIG. 1, the method comprises the steps of: A. forming a three-dimensional ordered microstructure of particles, so that interstitial voids are formed between the particles; B. heating the three-dimensional ordered microstructure to soften the particles; C. filling an inverse opal material into the interstitial voids; and D. removing the three-dimensional ordered microstructure to obtain the three-dimensional ordered porous microstructure.

According to the invention, the term "three-dimensional ordered microstructure" may refer to any microstructure formed through a three-dimensional ordered arrangement of constituting particles. The term "ordered" as used herein may refer to the particles being arranged in a regular or periodic manner, preferably being spaced apart from one another in an equal distance. The particles which constitute the microstructure are normally made uniform in particle size, shape, chemical composition, inner texture and surface property, such that the non-covalent interactions among them are facilitated, whereby they spontaneously arrange themselves into a lattice-like regular structure. In a preferred embodiment, the particles are monodisperse spheres having a uniform particle size, more preferably having a uniform particle size ranging from 1 nm to 1000 μm, such as from 100 nm to 6 μm.

In a preferred embodiment, at least some of the particles in the three-dimensional ordered microstructure are in a close-packing arrangement, i.e., adjacent particles being tangent to one another and the centers of any three mutually tangent particles forming an equilateral triangle, while each particle has a coordination number of 12 and there leaves triangular voids among the particles. More preferably, at least some of the particles in the three-dimensional ordered microstructure are in a hexagonal closest packing (hcp) arrangement, a face centered cubic packing (fcc) arrangement, or a combined arrangement thereof. The inverse structure produced by using the three-dimensional ordered microstructure stated above as a template may be referred to herein as a three-dimensional ordered porous microstructure.

The three-dimensional ordered microstructure stated above can be formed by self-assembling of the particles. The term "self-assembling" or "self-assemble" as used herein may refer to a process of micron- or nano-scale particles aggregating into the three-dimensional ordered microstructure in response to the conditions present in the environment. In particular, self-assembling refers to a process in which the particles interact non-covalently with one another to spontaneously form a three-dimensional ordered microstructure under near thermodynamic equilibrium conditions. The non-covalent interactions may include van der Waals interaction, π-π interaction and hydrogen bonding.

Non-limiting examples of the material that may be used to produce the particles include polymeric materials, inorganic materials and metallic materials. Examples of the polymeric materials include but are not limited to homopolymeric materials, such as polystyrene (PS), poly(methyl methacrylate) (PMMA), poly(butyl methacrylate) (PBMA), poly(methyl acrylate), poly(ethyl acrylate) (PEA), poly(butyl acrylate) (PBA), poly(benzyl methacrylate), poly($\alpha$-methyl styrene), poly(phenyl methacrylate), poly(biphenyl methacrylate), poly(cyclohexyl methacrylate), and copolymeric materials, such as acrylonitrile-styrene copolymers, styrene-methyl methacrylate copolymers, styrene-butyl methacrylate copolymers and styrene-butyl acrylate copolymers. Examples of the inorganic materials include but are not limited to titanium oxide, zinc oxide, cerium oxide, tin oxide, thallium oxide, barium oxide, aluminum oxide, yttrium oxide, zirconium oxide, copper oxide, nickel oxide and silicon oxide. Examples of the metallic materials include but are not limited to gold, silver, copper, platinum, aluminum, zinc, cerium, thallium, barium, yttrium, zirconium, tin, titanium, cadmium, iron and the alloys thereof.

In a preferred embodiment, the particles used are made of polymeric material and more preferably made of a homopolymer or copolymer of monomers selected from the group consisting of styrene monomers, methacrylate monomers and acrylate monomers. In one embodiment, the particles used are homogeneous spherical particles made of a single type homopolymer or copolymer. In another embodiment, the particles used have a core-shell architecture. The term "core-shell architecture" as used herein may refer to a particle having a core and a shell covering the core, wherein the core and shell are made of substantially different polymeric materials. These micron- or nano-scale particles may be manufactured by the methods known in the art. For instance; in the case where the particles used are made of polystyrene, an emulsifier-free emulsion polymerization process may be employed to synthesize polystyrene spheres having a particle size of hundred nanometers. To manufacture particles with a core-shell architecture, the emulsifier-free emulsion polymerization process is also applicable, in which a first monomer is polymerized for a period of time to form the core, and then a second monomer is added to form the shell composed of a copolymer of the first and the second monomers.

In the Step A of forming the three-dimensional ordered microstructure, a suspension may be prepared first, in which a plurality of colloid spherical particles are uniformly dispersed. For example, in the case where the colloid spherical particles used are made of polystyrene or silicon dioxide, the suspension may be prepared by uniformly dispersing the particles in a solvent. Suitable solvents include any known solvents which can achieve the purpose of uniformly dispersing the particles without chemically reacting with the particles and the other participants existing in the method. The solvent may be either an organic solvent or an aqueous solvent, including but not limited to water and $C_{1-6}$ alkanols, preferably water, and methanol, ethanol and the aqueous solutions thereof. The self-assembling of the particles may be facilitated by means of gravity sedimentation, centrifugation, vacuum filtration or electrophoresis, thereby forming a three-dimensional ordered microstructure of the particles in closest packing. In a preferred embodiment, said suspension is loaded into a tubular mold, so as to form a three-dimensional ordered microstructure with high aspect ratio, which is subsequently used as a template to produce a three-dimensional ordered porous microstructure with high aspect ratio.

Figure 2:
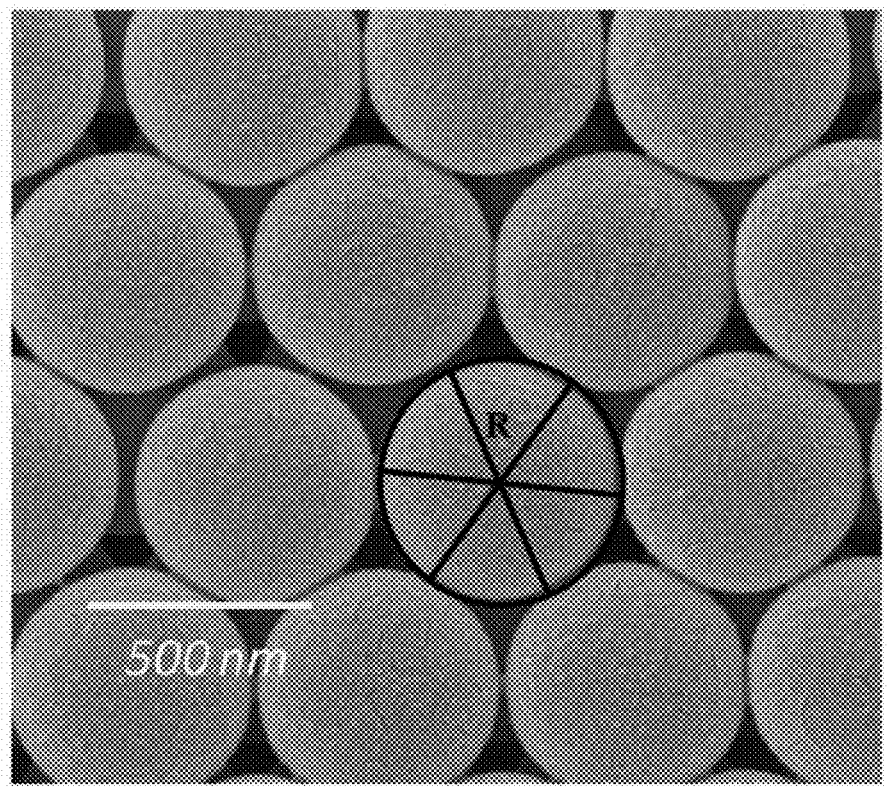
FIG. 2 is an electron microscopic image of orderly arranged polystyrene particles without experiencing heat treatment.
Figure 3:
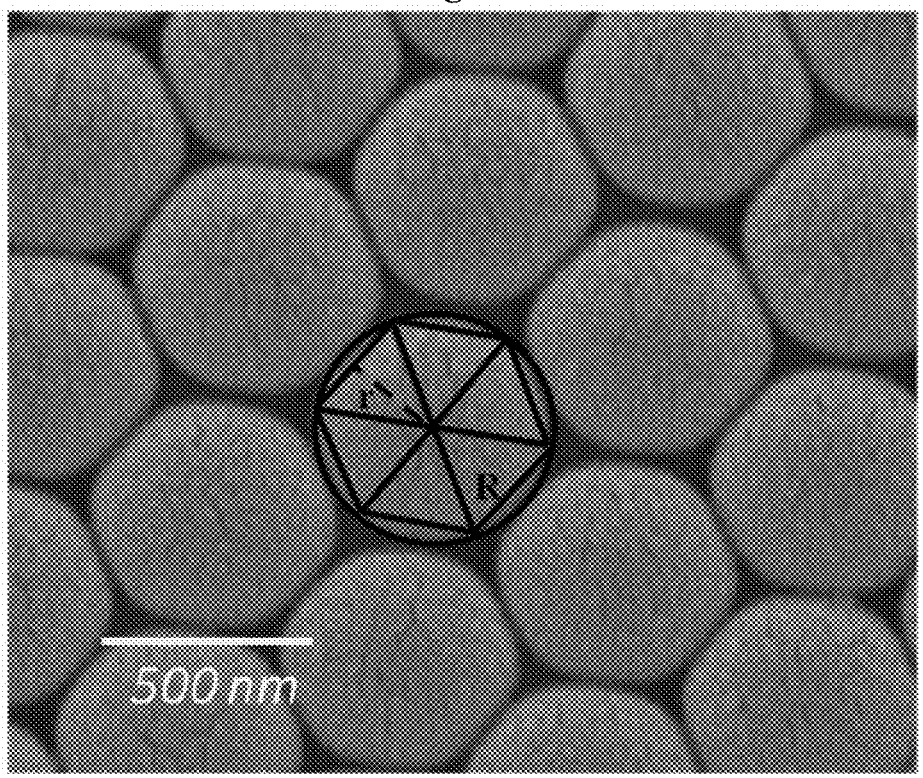
FIG. 3 is an electron microscopic image of orderly arranged polystyrene particles, showing that the particles are softened by heating and begin to deform.

The inventors found that when said three-dimensional ordered microstructure is subjected to heat to soften the particles that constitute the microstructure, the contact areas between the adjacent particles in the three-dimensional ordered microstructure would tend to increase, thus enhancing the mechanical strength of the three-dimensional ordered microstructure produced. The term "soften" as used herein may mean that the orderly arranged particles are rendered to deform and stick to one another under the effect of heat, whereas the interstitial voids among the particles are kept in an appropriate size. The softening of particles can be observed and measured through electron microscopy. FIG. 2 shows the polystyrene spherical particles which are not subjected to heat treatment and thus not softened. The shape of the particles approximates to a true sphere. FIG. 3 shows that the polystyrene particles arranged in closest packing are softened by heat and start to deform. Under the circumstances, an increase in the contact areas between the individual particles and the particles adjacent thereto is observed. Taking a softened spherical particle as an example, the ratio of its shortest radius r to its longest radius R will be greater than $\sqrt{3/2}$ but smaller than 1, i.e., $$\frac{\sqrt{3}}{2} < \frac{r}{R} < 1.$$

Figure 4:
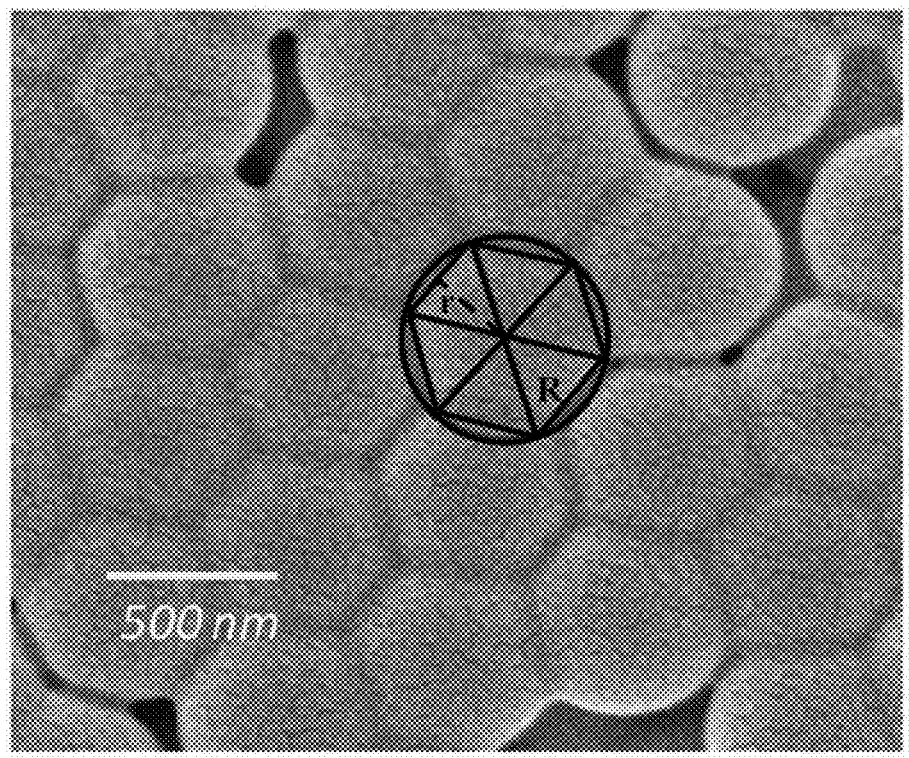
FIG. 4 is an electron microscopic image of polystyrene particles, showing that the particles are deformed after treated with heat for a long period of time.

In the embodiment shown in FIG. 3, the r/R ratio of the particles is about 0.94. The contact areas between adjacent particles in the three-dimensional ordered microstructure are correlated with the size of connecting pores interconnecting the macropores in the three-dimensional ordered porous microstructure produced subsequently. In other words, the smaller the r/R ratio is, the larger is the size of the connecting pores relative to the macropores in the three-dimensional ordered porous microstructure according to the invention, while the diameter of the connecting pores is approximately $2r/\sqrt{3}$. In a preferred embodiment, said r/R is less than or equal to 0.99, more preferably less than or equal to 0.98, even more preferably less than or equal to 0.96, such as less than or equal to 0.94. Likewise, the r/R ratio of non-spherical particles, e.g., elliptic particles, would decrease with softening by heat. FIG. 4 shows that the polystyrene spherical particles deform after treated with heat for a long period of time. As a result, individual particles and the particles adjacent thereto stick together completely without any voids existing in-between the particles, forming an approximately regular hexagonal configuration. The resultant microstructure cannot be used as a template for producing inverse structure. According to the invention, the softened degree of the particles can be controlled by adjusting the temperature and/or the duration of the heat treatment, so as to keep appropriate interstitial voids among particles.

As appreciated by a person with ordinary skill in the art, when the micro- or nano-scale particles used in the invention are made of crystalline material, the softening begins at a temperature above the melting point. Alternatively, in the case where the micro- or nano-scale particles used in the invention are made of amorphous material, they can have a glass transition temperature. The term "glass transition temperature" as used herein, or abbreviated to "$T_g$", may refer to the temperature at which the transition of the material that constitutes the particles between its brittle glassy state and its flexible rubbery state occurs. The glass transition temperature can be determined by differential scanning calorimetry according to ASTM-EI356. It is known that the $T_g$ of a certain polymer can be changed by copolymerization with other monomers, modification of branch density, adjustment of chain length, adjustment of cross-linking degree and addition of a plasticizer. For example, the $T_g$ of commercially available styrene homopolymer spherical particles is about 105° C. As shown in the Examples 1 to 6 below, the $T_g$ of polystyrene-based spherical particles can be reduced effectively by copolymerizing different monomers with styrene.

It is known in the art that the spherical particles would be in the rubbery state at a temperature equal to or higher than their $T_g$ where they become mobile and start to deform, whereas they exist in the form of hard spheres at a temperature lower than their $T_g$. Therefore, in a preferred embodiment of heating step B, the three-dimensional ordered microstructure is heated at a temperature higher than the glass transition temperature by about 0 to 20° C. for a period of time to soften the particles. Since the particles would deform rapidly in the rubbery state, the duration of the heat treatment is usually short, e.g., from several seconds to several minutes. Using particles with a large particle size is often preferred and, for example, the particles having a diameter larger than 1 μm may be chosen to prevent the particles from deforming too fast. After heating, the temperature may be reduced to a level lower than the $T_g$ of the particles, so as to revert the particles back to the glassy state. Meanwhile, the solvent for suspending the particles in Step A may be removed by vaporization or vacuum drying at the lower temperature.

The inventors unexpectedly found that after a heat treatment at a temperature lower than their $T_g$ by about 1 to 15° C. for a period of time, the particles were not transitioned to the rubbery state, but they were softened. Without wishing to be bound by theory, it is believed that the molecules of the material that constitutes the particles may gain enough energy to become slightly mobile at a temperature close to the $T_g$, resulting in slight softening of the particles. In the embodiment where the particles are homogeneous spheres made of a single type homopolymer or copolymer, said $T_g$ refers to the bulk $T_g$ of the particles. In the embodiment where the particles have a core-shell architecture, the core may be made of a homopolymer of first monomers (e.g., styrene), and the shell may be made of a copolymer of the first monomers and different second monomers (e.g., butyl methacrylate). In this case, said $T_g$ refers to the $T_g$ of the shell, which may preferably be lower than the $T_g$ of the core, making the shell easier to be softened than the core in the temperature range stated above.

Therefore, in another preferred embodiment of the heating step B, the three-dimensional ordered microstructure is treated with heat at a temperature lower than the $T_g$ of the particles by about 1 to 15° C., more preferably at a temperature lower than the $T_g$ of the particles by about 3 to 10° C., such as at a temperature lower than the $T_g$ of the particles by about 3 to 5° C., for a period of time, so as to soften the particles. Preferably, the solvent for suspending the particles in the Step A may be removed at this stage. In order to prevent the evaporating solvent from flowing so fast as to damage the three-dimensional ordered microstructure, it is preferably that the heating temperature is selected to be a temperature substantially lower than the boiling point of the solvent but allowing the solvent to evaporate effectively. In the embodiment where water, a $C_{1-6}$ alkanol, such as methanol, ethanol or a combination thereof, is used as the solvent, since the boiling point of the solvent is low, it is preferably that the particles for building up the three-dimensional ordered microstructure have a low $T_g$, such that a suitable temperature can be selected and used in Step B for softening the particles and removing the solvent simultaneously. In the preferred embodiments, the $T_g$ of the particles is within a range from 0° C. to 100° C., preferably within a range from 50° C. to 95° C., more preferably within a range from 60° C. to 90° C., such as from 75° C. to 85° C. The duration of the heat treatment may vary, as long as the particles are softened and the solvent is removed. Generally, the lower the heating temperature is, the longer the duration of the heat treatment must be, so as to attain the purposes stated above. The duration of the heat treatment may range from several minutes to several days, preferably from tens' of minutes to one day, so as to achieve mass production.

In the Step C of filling interstitial voids, an inverse opal material is filled into the interstitial voids of the three-dimensional ordered microstructure. The inverse opal material includes but is not limited to: metals, such as gold, silver, copper, nickel, platinum and nickel-tungsten alloys; oxides, such as zinc oxide, silicon dioxide and cuprous oxide; and polymers, such as polystyrene, polyacrylates, polymethacrylates, acrylamides, polypyrrole, polyethylene, polypropylene, polyvinyl chloride and silicones. In the embodiments of producing a monolithic column, it is preferably that the inverse opal material is selected from polymeric hydrogels produced by polymerization of hydrophilic monomers, such as acrylamides, acrylates, methacrylates and siloxanes. Preferred polymeric hydrogels include but are not limited to poly(hydroxyethyl methacrylate) (PHEMA), poly(glycidyl methacrylate) (PGMA), poly(dimethylsiloxane) (PDMS), poly(propyl acrylamide) and their derivatives. The filling of the inverse opal material may be performed by, for example, centrifugation, vacuum suction, pressure infiltration, sputtering, electroplating, chemical vapor deposition and atomic layer deposition. In the embodiment where the inverse opal material is a polymer, the monomers and/or the precursors of said polymer may be filled in the voids and then cured in situ.

In the Step D of removing the three-dimensional ordered microstructure, the particles existing in the three-dimensional ordered microstructure are removed after the inverse opal material is cured. Techniques for removal of the microstructure include but are not limited to chemical removal processes and thermal removal processes. For example, in conventional chemical removal processes, a thin-film type microstructure may be treated with a chemical agent capable of dissolving the particles but not substantially dissolving the inverse opal material, such as toluene, acetone, ethyl acetate, hydrogen fluoride and sodium hydroxide, so as to separate the particles from the cured inverse opal material. However, when the microstructure with a high aspect ratio is processed by the conventional soaking or immersing processes, the template is unlikely to be removed completely. In addition, since the inverse opal material used to produce monolithic columns is usually polymeric material that cannot withstand high temperatures and, in this case, thermal removal processes are generally not applicable for removing the template.

Surprisingly and unexpectedly, the inventors further found that the difficulty in removal of a template from a microstructure with a high aspect ratio can be readily overcome by using Soxhlet extraction or supercritical fluid extraction. Accordingly, in a preferred embodiment of the invention, the three-dimensional ordered microstructure is removed by using a process selected from the group consisting of Soxhlet extraction and supercritical fluid extraction. The term "Soxhlet extraction" as used herein may refer to placement of a microstructure in a Soxhlet extractor and continuous extraction of the template material from the microstructure with a refluxed solvent capable of dissolving the template. Generally, the temperature used in Soxhlet extraction may be set to be higher than the boiling point of the solvent, and the extraction may last 1-10 days, such as 3-7 days. The term "supercritical fluid extraction" as used herein may refer to an extraction wherein a supercritical fluid at a temperature and a pressure above its critical point is employed to dissolve the template material and then the template material is separated from the supercritical fluid by reducing the pressure or increasing the temperature. In a preferred embodiment, $CO_2$ serves as the supercritical fluid and is used with a co-solvent, such as acetone, toluene or ethyl acetate, to remove polystyrene-based template material.

The three-dimensional ordered porous microstructure produced by the method disclosed herein may be subjected to additional processing, thereby obtaining various commercial products. In a preferred embodiment, said three-dimensional ordered porous microstructure may be further processed by conventional cutting and packaging processes and/or imparted with appropriate surface functionality through chemical modification, so as to obtain a monolithic column which can serve as a stationary phase material for chromatographic separation. The term "monolithic column" as used herein may include a continuous medium composed of the inverse opal material, which may comprise a plurality of orderly arranged spherical macropores having a uniform diameter ranging from 100 nm to 6 microns, and a plurality of connecting pores interconnecting the macropores, with the connecting pores having a uniform diameter ranging from 10 nm to 3 microns. In a preferred embodiment, the spherical macropores are in a close-packing arrangement. In this case, each macropore is interconnected to adjacent macropores via twelve connecting pores. Preferably, at least 70% of the macropores, more preferably at least 80% of the macropores, and most preferably at least 90% of the macropores, such at least 95% of the macropores, in the monolithic column are in a close-packing arrangement. The respective macropores have a longest radius R and a shortest radius r, and the ratio of the shortest radius r to the longest radius R can be expressed by an inequality $$\frac{\sqrt{3}}{2} < \frac{r}{R} < 1.$$

The smaller r/R ration is, the larger are the connecting pores relative to the macropores in the three-dimensional ordered porous microstructure, whereas the diameter of the connecting pores is about $2r/\sqrt{3}$. In a preferred embodiment, the connecting pores in the column have a large pore size, i.e., the r/R ratio is less than or equal to 0.99, preferably less than or equal to 0.98, more preferably less than or equal to 0.96, such as less than or equal to 0.94. The monolithic column may further include a hollow tube, which may be made of stainless steel, quartz or glass and formed with an inner wall to which the continuous medium adheres. In a preferred embodiment, the monolithic column disclosed herein has a height of at least 1 cm, such as at least 3 cm or at least 5 cm, and an aspect ratio of no less than 1, such as no less than 2.5 or no less than 3. The term "aspect ratio" as used herein may refer to the ratio of the height to the diameter of a monolithic column.

The following examples are given for the purpose of illustration only and are not intended to limit the scope of the invention.

Example 1: Preparation of Polystyrene-Butyl Methacrylate Nanospheres

A butyl methacrylate monomer solution was added in a styrene monomer solution (99.6 parts by weight), and the solid content of the mixture was adjusted to 10 wt %. The mixture is stirred at 350 rpm for 1 hour, while the temperature was kept at 65° C. Afterwards, 0.25 g potassium sulfate was added into the mixture to initiate the polymerization reaction. All the monomers were completely consumed after 16 hours. In this Example, the butyl methacrylate monomer solution was added in an amount between 10 to 30 ml, so that the Tg of the polystyrene-based particles was adjusted to 82° C.–26° C.

Example 2: Preparation of Polystyrene-Butyl Acrylate Nanospheres

A butyl acrylate monomer solution was added in a styrene monomer solution (99.6 parts by weight), and the solid content of the mixture was adjusted to 10 wt %. The mixture was stirred at 350 rpm for 1 hour, while the temperature was kept at 65° C. Afterwards, 0.25 g potassium sulfate was added into the mixture to initiate the polymerization reaction. All the monomers were completely consumed after 16 hours. In this Example, the butyl acrylate monomer solution was added in an amount between 10 to 30 ml, so that the Tg of the polystyrene-based particles was adjusted to 50° C.–0° C.

Example 3: Preparation of Poly(Styrene-Butyl Methacrylate) Core-Shell Nanospheres A styrene monomer solution (99.6 parts by weight) was adjusted to reach a solid content of 10 wt %. The mixture was stirred at 350 rpm for 1 hour, while the temperature was kept at 65° C. Afterwards, 0.25 g potassium sulfate was added into the mixture to initiate the polymerization reaction. After a period of time, a butyl methacrylate monomer solution was added so that a shell of a styrene-butyl methacrylate copolymer was formed. In this Example, the butyl methacrylate monomer solution was added in an amount between 10 to 30 ml, so that the Tg of the shell was adjusted to 40° C.–26° C.

Example 4: Preparation of Poly(Styrene-Butyl Acrylate) Core-Shell Nanospheres A styrene monomer solution (99.6 parts by weight) was adjusted to reach a solid content of 10 wt %. The mixture was stirred at 350 rpm for 1 hour, while the temperature was kept at 65° C. Afterwards, 0.25 g potassium sulfate was added into the mixture to initiate the polymerization reaction. After a period of time, a butyl acrylate monomer solution was added, so that a shell of a styrene-butyl acrylate copolymer was formed. In this Example, the butyl acrylate monomer solution was added in an amount between 10 to 30 ml, so that the Tg of the shell was adjusted to 10° C.–0° C.

Example 5: Preparation of Poly(Butyl Methacrylate-Styrene) Core-Shell Nanospheres A butyl methacrylate monomer solution (99.6 parts by weight) was adjusted to reach a solid content of 10 wt %. The mixture was stirred at 350 rpm for 1 hour, while the temperature was kept at 65° C. Afterwards, 0.25 g potassium sulfate was added into the mixture to initiate the polymerization reaction. After a period of time, a styrene monomer solution was added, so that a shell of a styrene-butyl methacrylate copolymer was formed. In this Example, the styrene monomer solution was added in an amount between 10 to 30 ml, so that the Tg of the shell was adjusted to 50° C.–80° C.

Example 6: Preparation of Poly(Butyl Acrylate-Styrene) Core-Shell Nanospheres A butyl acrylate monomer solution (99.6 parts by weight) was adjusted to reach a solid content of 10 wt %. The mixture was stirred at 350 rpm for 1 hour, while the temperature was kept at 65° C. Afterwards, 0.25 g potassium sulfate was added into the mixture to initiate the polymerization reaction. After a period of time, a styrene monomer solution was added, so that a shell of a styrene-butyl acrylate copolymer was formed. In this Example, the styrene monomer solution was added in an amount between 10 to 30 ml, so that the Tg of the shell was adjusted to 50° C.–80° C.

Example 7: Fabrication of Three-Dimensional Ordered Microstructure

Figure 5:
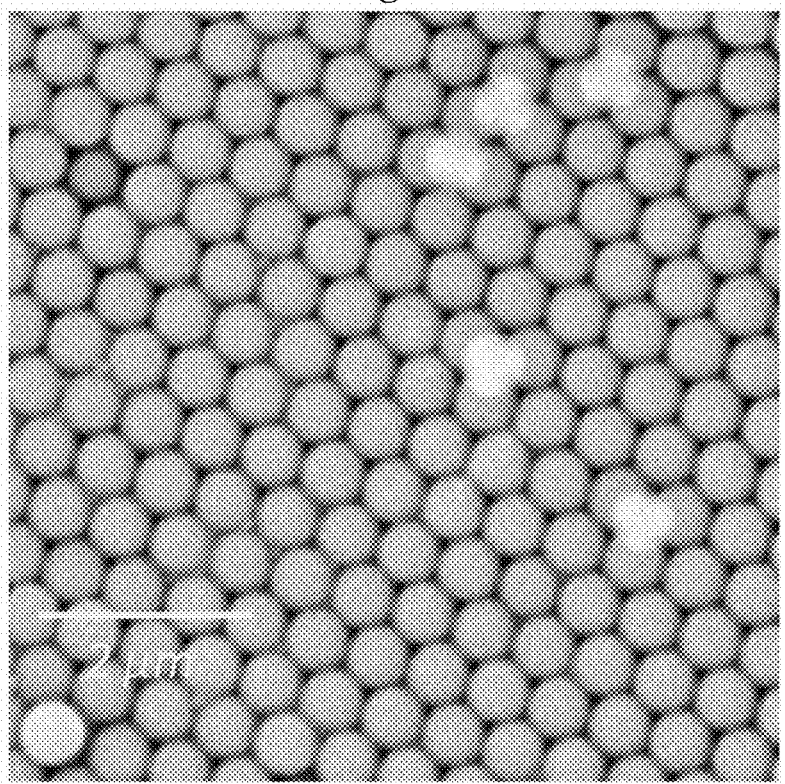
FIG. 5 is an electron microscopic image of three-dimensional ordered microstructure produced according to an embodiment of the invention.

A 30% solution of methanol in water was prepared, and the boiling point of water in the solution was about 95° C. as determined in actual measurement. The nanospheres prepared in Example 1 were suspended in the methanol aqueous solution, where the nanospheres have a $T_g$ of 80° C. and a uniform diameter of 600 nm. The suspension was loaded into a centrifuge tube having an inner diameter of 1.6 cm, and the nanospheres were allowed to undergo self-assembling until the nanospheres filled up the centrifuge tube, thereby forming a cylindrical three-dimensional ordered microstructure having a height of 4 cm and a diameter of 1.6 cm. The centrifuge tube was placed in a circulator oven (DENG YNG DO60), and the three-dimensional ordered microstructure was dried at 77° C. (which is 3° C. lower than the $T_g$ of the nanospheres) for 30 minutes, so as to remove the solvent. FIG. 5 shows the three-dimensional ordered microstructure produced according to this Example, wherein the nanospheres arranged in hexagonal closest packing were deformed slightly and slightly in hexagonal configuration, so that the adjacent nanospheres contact one another extensively. The microstructure thus produced is suitable for serving as a template for producing a monolithic column.

Example 8: Fabrication of Three-Dimensional Ordered Porous Microstructure

Hydroxyethyl methacrylate (HEMA) precursors were loaded into the centrifuge tube, and the three-dimensional ordered microstructure prepared in Example 7 was used as template. The HEMA precursors were forced to fill in the interstitial voids of the template under centrifuge and then cured at 55° C. in a water bath. After curing, the microstructure was taken out from the centrifuge tube and trimmed into a suitable size for fitting into a stainless steel HPLC column. The microstructure was then brought into tight contact with the inner wall of the HPLC column by a packaging adhesive. The microstructure encapsulated in the column was subjected to Soxhlet extraction with refluxed toluene for 5 days. The viscosity of the solvent was kept between 0.2-0.6 psi during the extraction, thereby removing the template to obtain a monolithic column product.

Figure 6:
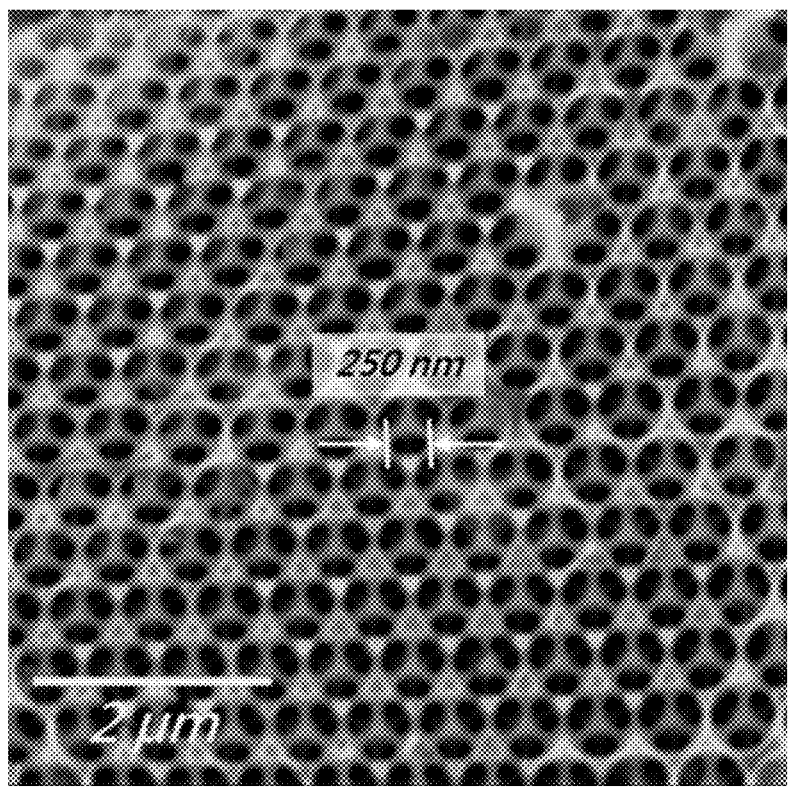
FIG. 6 is an electron microscopic image showing a cross-sectional view of a three-dimensional ordered porous microstructure according to an embodiment of the invention, which is produced by using Soxhlet extraction to remove the three-dimensional ordered microstructure.
Figure 7:
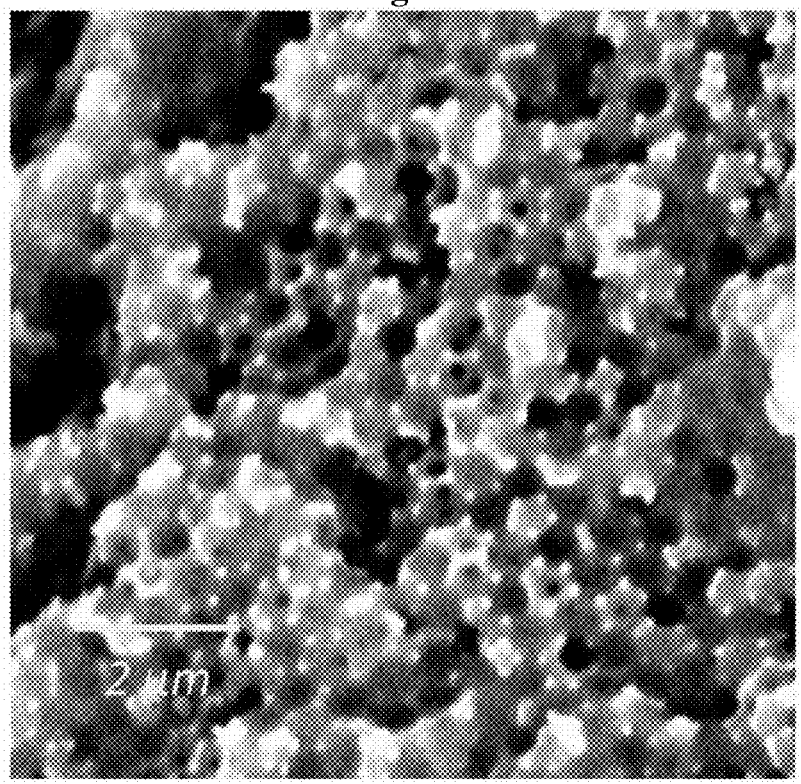
FIG. 7 is an electron microscopic image of a three-dimensional ordered porous microstructure produced by using conventional immersing process to remove the three-dimensional ordered microstructure.

FIG. 6 shows that the use Soxhlet extraction according to this Example may facilitate the solvent to enter the submicro-scale pores, so as to dissolve the particles and carry them out of the microstructure, whereby the template material was removed completely. In the three-dimensional ordered porous microstructure produced according to this Example, there are spherical macropores having a diameter of 600 nm and arranged in closest packing, and connecting pores interconnecting the macropores and having a diameter of 250 nm. In contrast, the conventional soaking method failed to remove the template material completely, as shown in FIG. 7.

Figure 8:
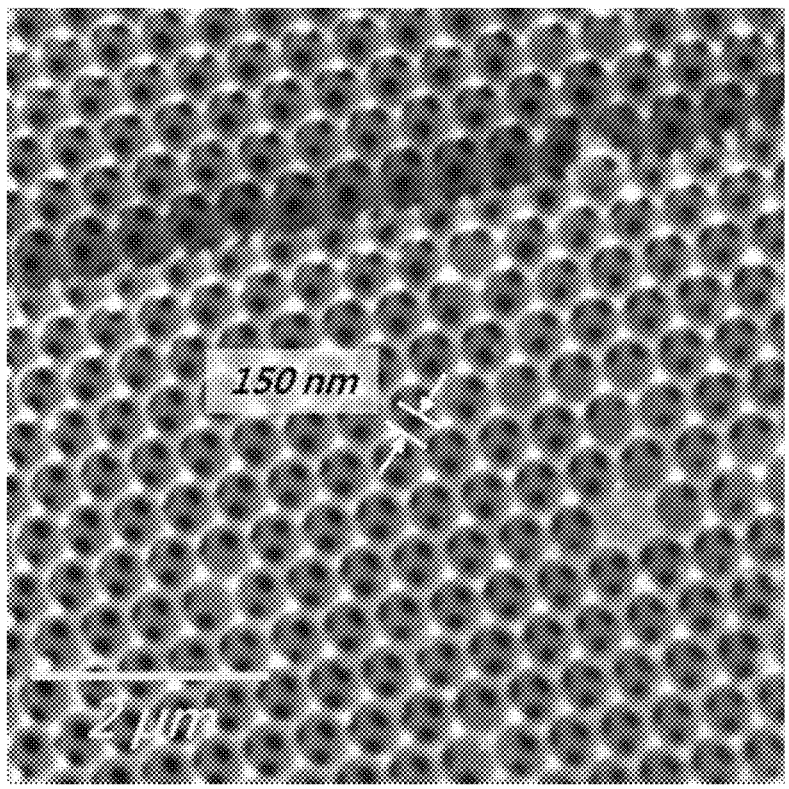
FIG. 8 is an electron microscopic image showing a cross-sectional view of a three-dimensional ordered porous microstructure produced according to another embodiment of the invention.

Example 9: Fabrication of Three-Dimensional Ordered Microstructure and Three-Dimensional Ordered Porous Microstructure The fabrication procedures of Examples 7 and 8 were repeated, except that the temperature at which the three-dimensional ordered microstructure was heated was reduced to 65° C. (which is 15° C. lower than the 7 of the nanospheres). The heat treatment lasted 120 minutes. FIG. 8 shows that the three-dimensional ordered porous microstructure produced according to this Example comprises spherical macropores having a diameter of 600 nm and arranged in closest packing, as well as connecting pores interconnecting the macropores and having a diameter of 150 nm.

Example 10: Fabrication of Three-Dimensional Ordered Microstructure

Figure 9:
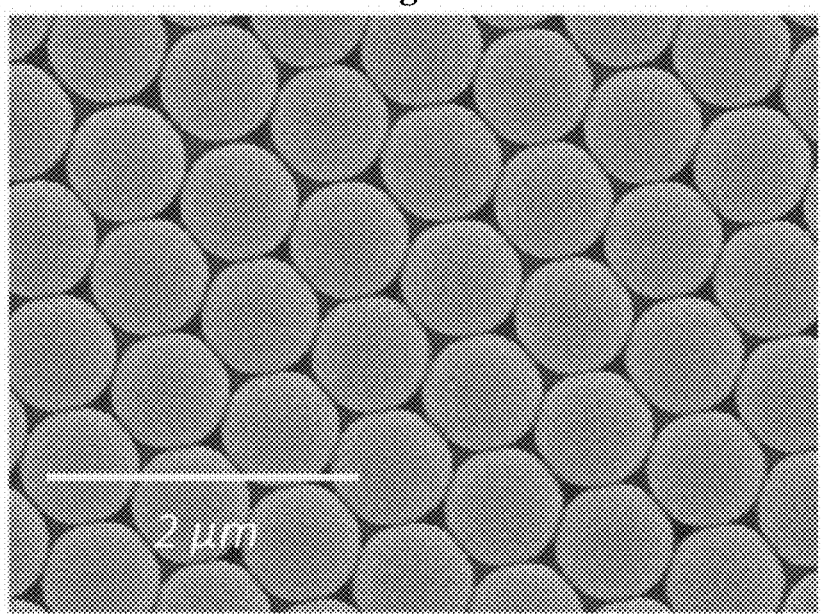
FIG. 9 is an electron microscopic image showing a cross-sectional view of a three-dimensional ordered microstructure produced according to another embodiment of the invention.

The fabrication procedures of Example 7 were repeated, and the nanospheres having a uniform diameter of 1 µm and a $T_g$ of 80° C. as prepared according to Example 1 were used, except that the temperature at which the three-dimensional ordered microstructure was heated was increased to 100° C. (which is 20° C. higher than the $T_g$ of the nanospheres). The heat treatment lasted 3 minutes. Afterwards, the temperature was reduced to 75° C. (5° C. lower than the $T_g$ of the nanospheres), and the three-dimensional ordered microstructure was dried for 30 minutes to remove the solvent. FIG. 9 shows the three-dimensional ordered microstructure produced according to this Example, wherein the nanospheres arranged in hexagonal closest packing were deformed slightly and slightly hexagonal in shape, so that the adjacent nanospheres contact one another extensively. The microstructure thus produced is suitable for serving as a template for producing a monolithic column.

Comparative Example 1: Fabrication of Three-Dimensional Ordered Microstructure

Figure 10:
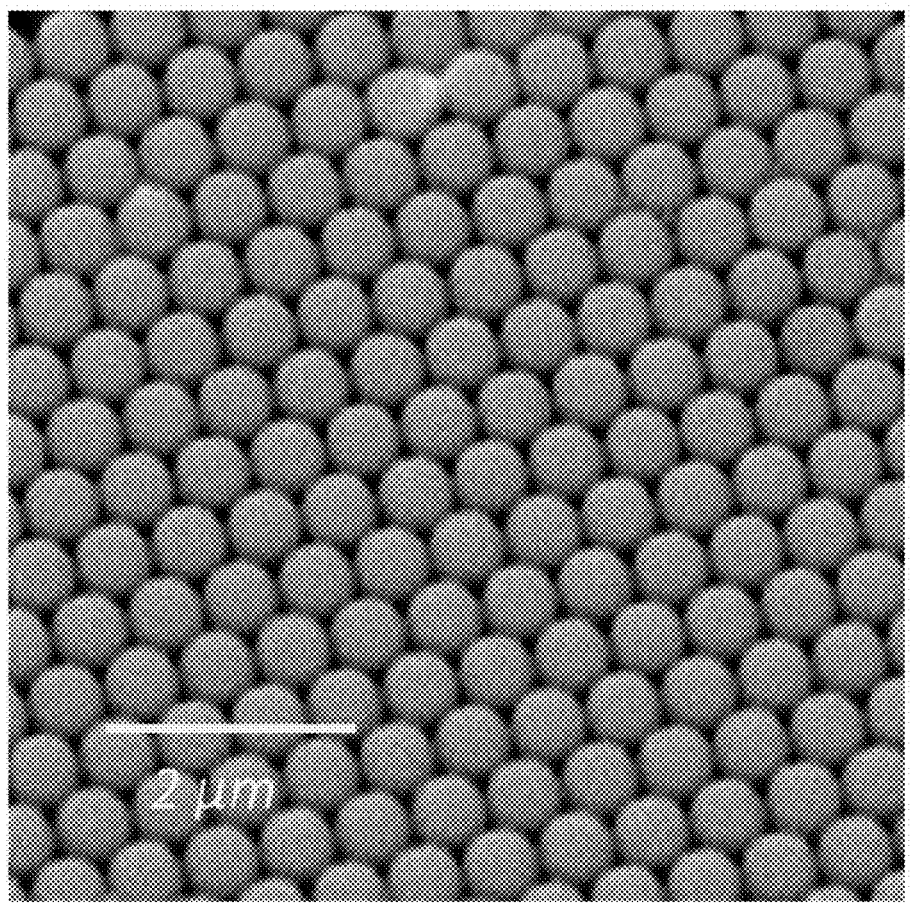
FIG. 10 is an electron microscopic image showing a cross-sectional view of a three-dimensional ordered microstructure produced according to a comparative example.

The fabrication procedure of Example 7 was repeated, except that the temperature at which the three-dimensional ordered microstructure was heated was reduced to 60° C. (20° C. lower than the $T_g$ of the nanospheres). After a 30-minute drying period, most of the solvent still remained. The drying time was prolonged to 80 minutes eventually. FIG. 10 shows the three-dimensional ordered microstructure produced according to this comparative example, wherein the nanospheres were arranged in hexagonal closest packing. The nanospheres were approximately spherical, and there existed no considerable contact among the nanospheres.

Comparative Example 2: Fabrication of Three-Dimensional Ordered Microstructure

Figure 11:
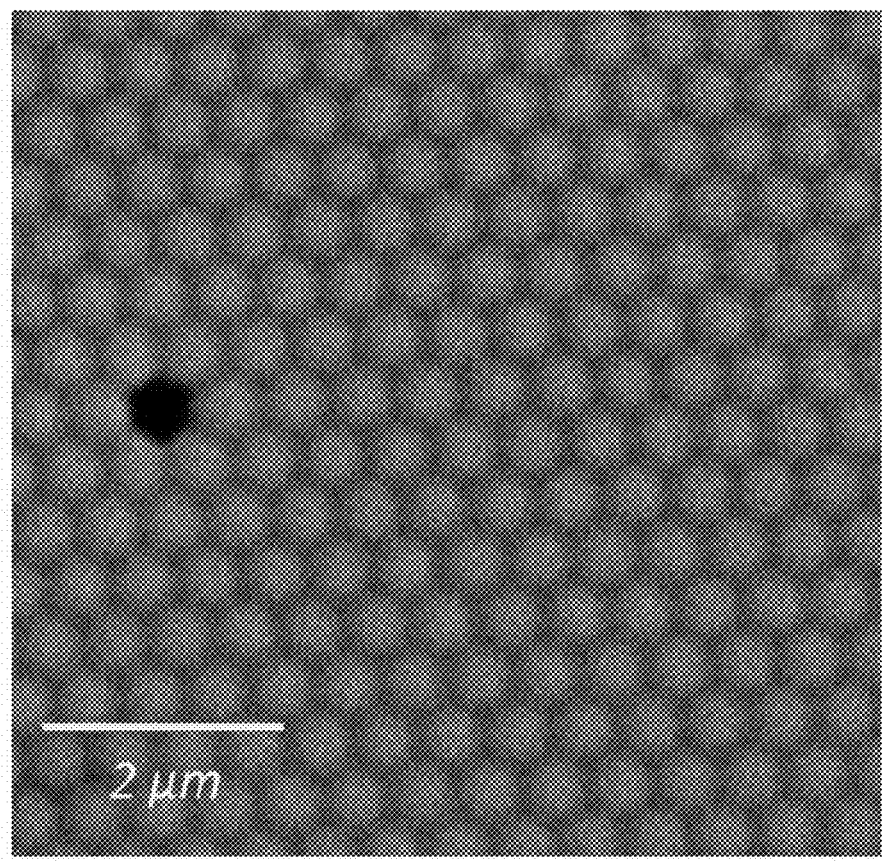
FIG. 11 is an electron microscopic image showing a cross-sectional view of a three-dimensional ordered microstructure produced according to another comparative example.

The fabrication procedure of Example 7 was repeated, except that the temperature at which the three-dimensional ordered microstructure was heated was increased to 90° C. (10° C. higher than the $T_g$ of the nanospheres). The heat treatment lasted 15 minutes. FIG. 11 shows the three-dimensional ordered microstructure produced according to this comparative example, wherein the nanospheres were arranged in hexagonal closest packing. The nanospheres were approximately regular hexagon in shape, while they were intimately contact one another with no interstitial voids present among them. The microstructure thus produced cannot be used as a template.

Comparative Example 3: Fabrication of Three-Dimensional Ordered Microstructure

Figure 12:
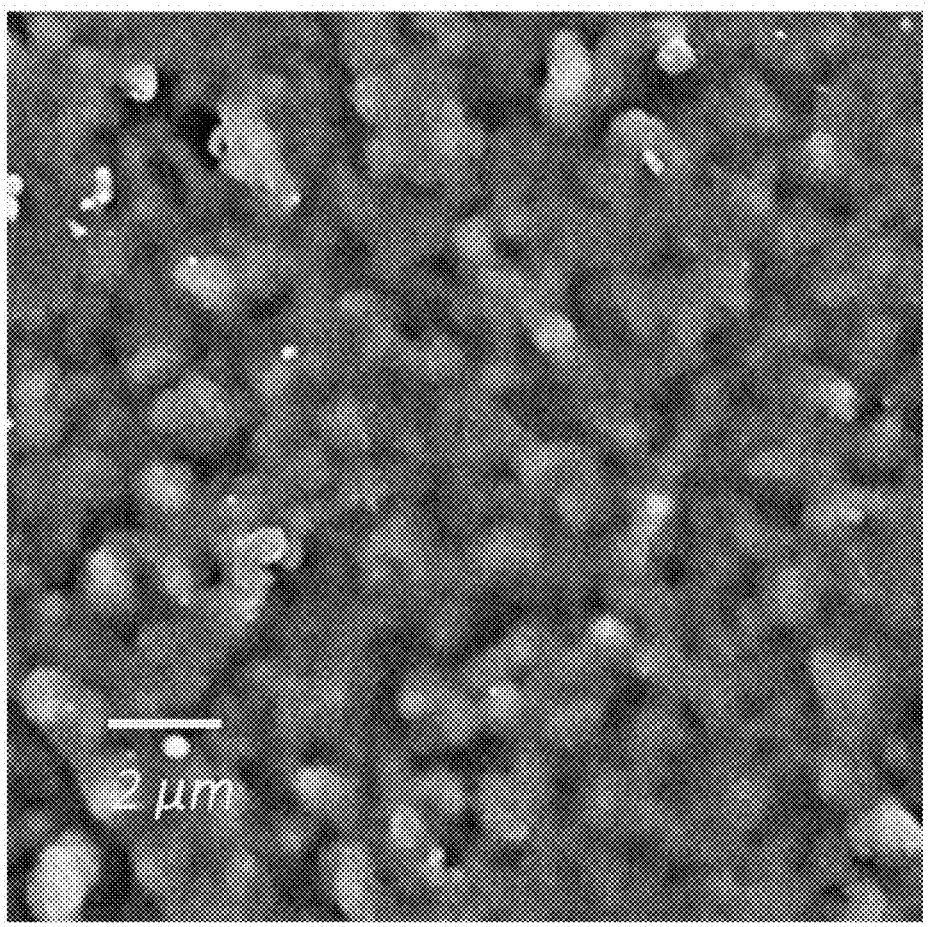
FIG. 12 is an electron microscopic image showing a cross-sectional view of a three-dimensional ordered microstructure produced according to another comparative example.

The fabrication procedure of Example 7 was repeated, except that the temperature at which the three-dimensional ordered microstructure was heated was increased to 110° C. (30° C. higher than $T_g$ of nanospheres). The heat treatment lasted 10 minutes. FIG. 12 shows the three-dimensional microstructure produced according to this comparative example, wherein the nanospheres were melted at high temperature and the outer profiles thereof were barely identified. The nanospheres were intimately contact one another, with no interstitial voids present among them. The microstructure thus produced cannot be used as a template.

Compared with conventional methods, the method disclosed herein involves subjecting the three-dimensional ordered microstructure to a heat treatment, so as to effectively increase the contact between orderly arranged particles while removing the solvent used to suspend the particles. Compared to the monolithic columns produced by conventional methods, the monolithic column according to the invention is characterized in having a higher aspect ratio and a higher pore regularity, while the connecting pores in the column are relatively large in pore size.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

The invention claimed is:

1. A method for producing a three-dimensional ordered porous microstructure, comprising the steps of:
   A. forming a three-dimensional ordered microstructure of substantially spherical particles made of polymeric material selected from the group consisting of a styrene-butyl methacrylate copolymer and a styrene-butyl acrylate copolymer by suspending the particles in a solvent of methanol and water and then allowing the particles to undergo self-assembling, so that interstitial voids are formed between the particles, wherein the particles have a glass transition temperature ranging from 50° C. to 95° C.;

B. heating the substantially spherical particles in the three-dimensional ordered microstructure at a temperature lower than the glass transition temperature by about 3 to 15° C. to soften the particles, so that the respective particles are deformed to have a longest radius R and a shortest radius r, where r/R ratio is greater than $\sqrt{3/2}$ but smaller than 1, and the solvent is concurrently evaporated from the three-dimensional ordered microstructure, wherein the solvent has a boiling point substantially higher than the temperature at which the particles are heated, so that the solvent is evaporated without being boiled;

C. filling an inverse opal material into the interstitial voids; and

D. removing the three-dimensional ordered microstructure to obtain the three-dimensional ordered porous microstructure.

2. The method for producing a three-dimensional ordered porous microstructure according to claim 1, wherein the step B comprises heating the three-dimensional ordered microstructure at a temperature lower than the glass transition temperature by about 3 to 10° C.

3. The method for producing a three-dimensional ordered porous microstructure according to claim 1, wherein the particles are homogeneous spherical particles, and the glass transition temperature is the bulk glass transition temperature of the particles.

4. The method for producing a three-dimensional ordered porous microstructure according to claim 1, wherein the particles have a core-shell architecture comprising a core and a shell covering the core, with the core and the shell being made of substantially different polymeric materials, and wherein the glass transition temperature is the glass transition temperature of the shell.

5. The method for producing a three-dimensional ordered porous microstructure according to claim 1, wherein the step D comprises removing the three-dimensional ordered microstructure by a process selected from the group consisting of Soxhlet extraction and supercritical fluid extraction.

6. The method for producing a three-dimensional ordered porous microstructure according to claim 1, wherein at least some of the particles in the three-dimensional ordered microstructure are in a close-packing arrangement.

* * * * *